United States Patent [19]
Ota et al.

[11] Patent Number: 6,061,079
[45] Date of Patent: *May 9, 2000

[54] LASER BEAM PRINTER WITH A COMMON SCANNING OPTICAL SYSTEM

[75] Inventors: Takeshi Ota; Masao Ito, both of Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/756,582

[22] Filed: Nov. 27, 1996

Related U.S. Application Data

[62] Division of application No. 08/222,642, Apr. 4, 1994, Pat. No. 5,784,094.

[30] Foreign Application Priority Data

Apr. 5, 1993 [JP] Japan .................................. 5-78363

[51] Int. Cl.⁷ .................. B41J 2/47; B41J 2/455
[52] U.S. Cl. .................. 347/243; 347/250; 347/137; 347/135
[58] Field of Search ..................... 347/233, 242, 347/243, 244, 256, 258, 259, 241, 135, 250; 359/204

[56] References Cited

U.S. PATENT DOCUMENTS

| | | | |
|---|---|---|---|
| 4,547,038 | 10/1985 | Mori ............................................ | 359/204 |
| 4,837,588 | 6/1989 | Imakawa et al. ......................... | 347/250 |
| 5,300,962 | 4/1994 | Genovese ................................. | 347/135 |
| 5,319,393 | 6/1994 | Genovese ................................. | 347/132 |
| 5,784,094 | 7/1998 | Ota et al. .................................. | 347/243 |

*Primary Examiner*—N. Le
*Assistant Examiner*—Thinh Nguyen
*Attorney, Agent, or Firm*—Finnegan, Henderson, Farabow, Garrett & Dunner, L.L.P.

[57] ABSTRACT

A semiconductor laser array emits a plurality of laser beams. A polygon mirror deflects the plurality of laser beams together. A prism type reflector separates the deflected laser beams to different directions that are generally along an arrangement direction of a plurality of photoreceptors. The separated laser beams are input to the respective photoreceptors through mirrors and cylindrical lenses.

3 Claims, 22 Drawing Sheets

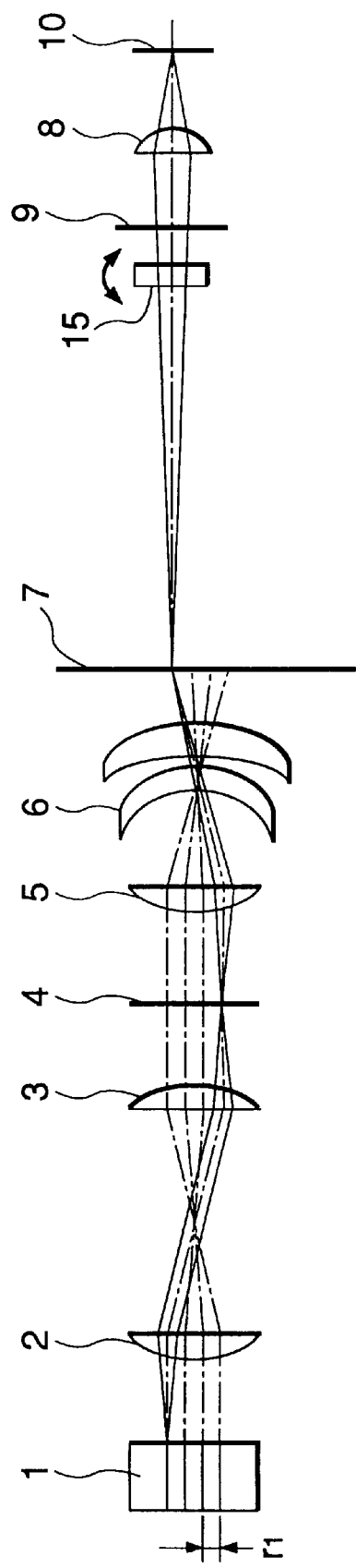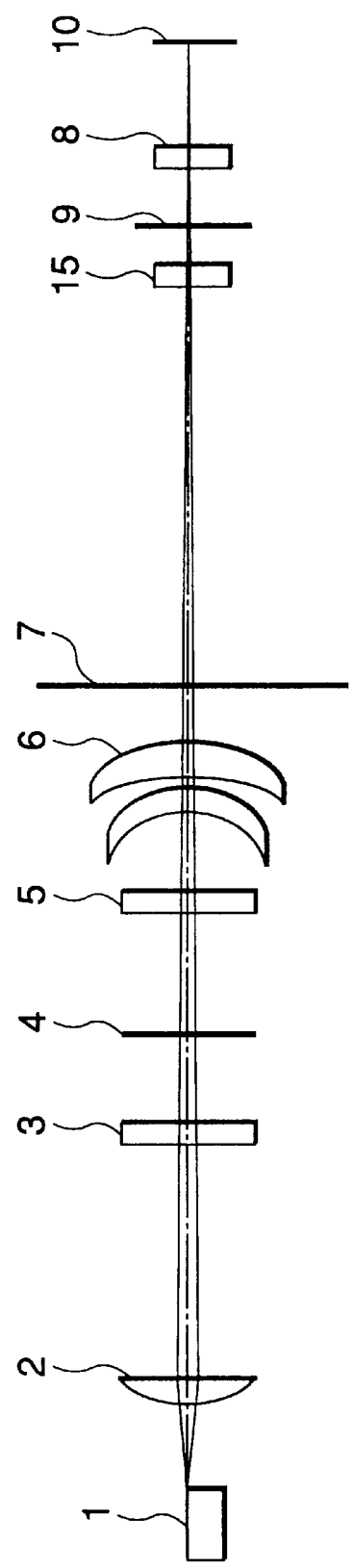

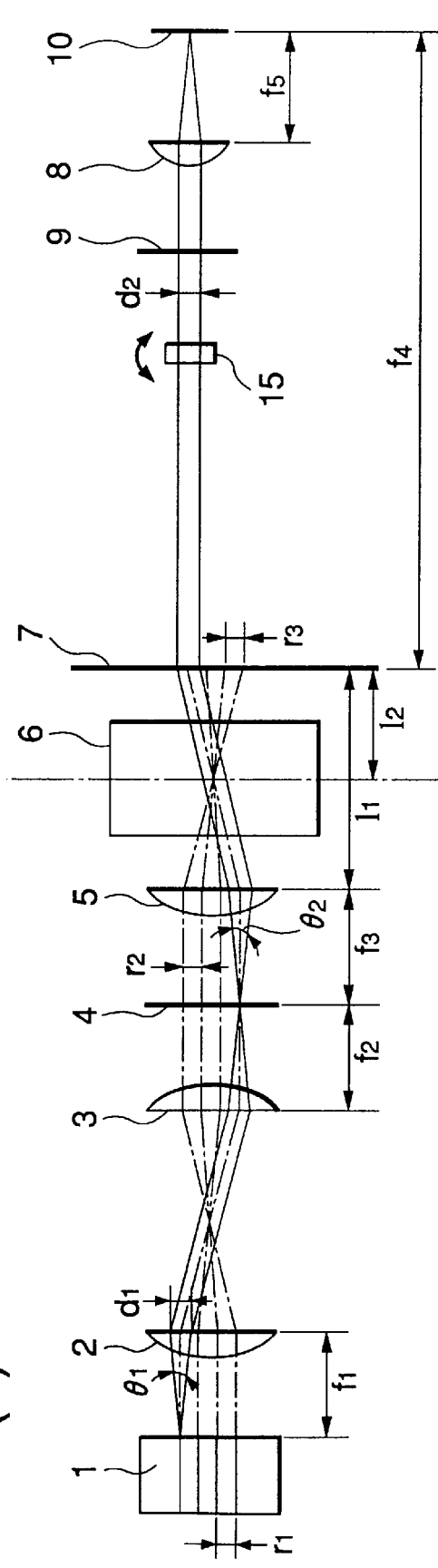
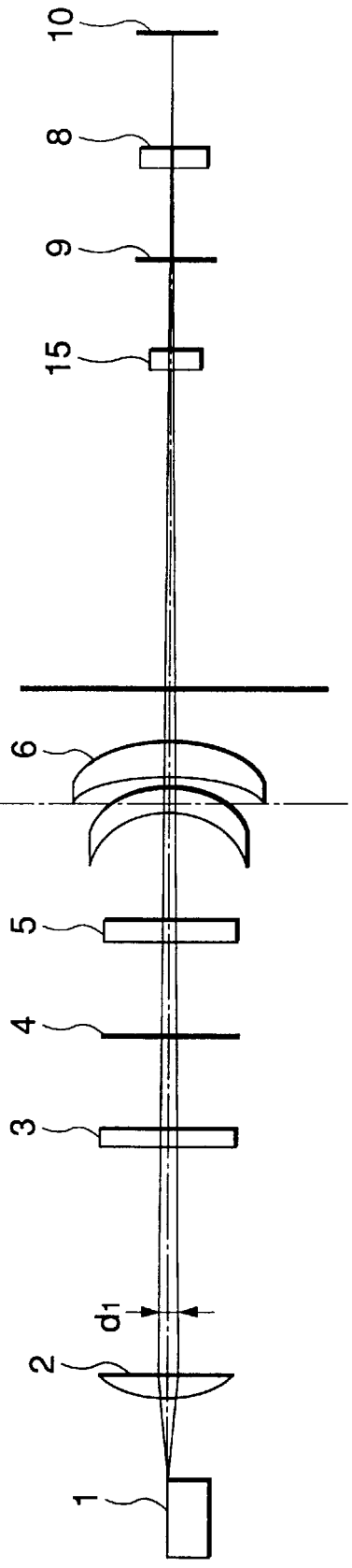
FIG.7(a)
FIG.7(b)

32

33

34

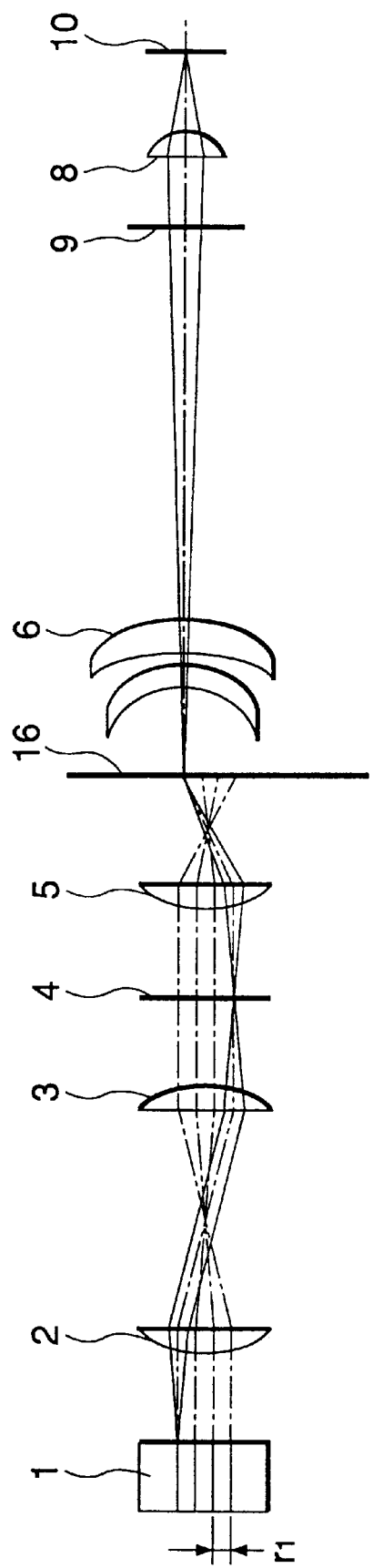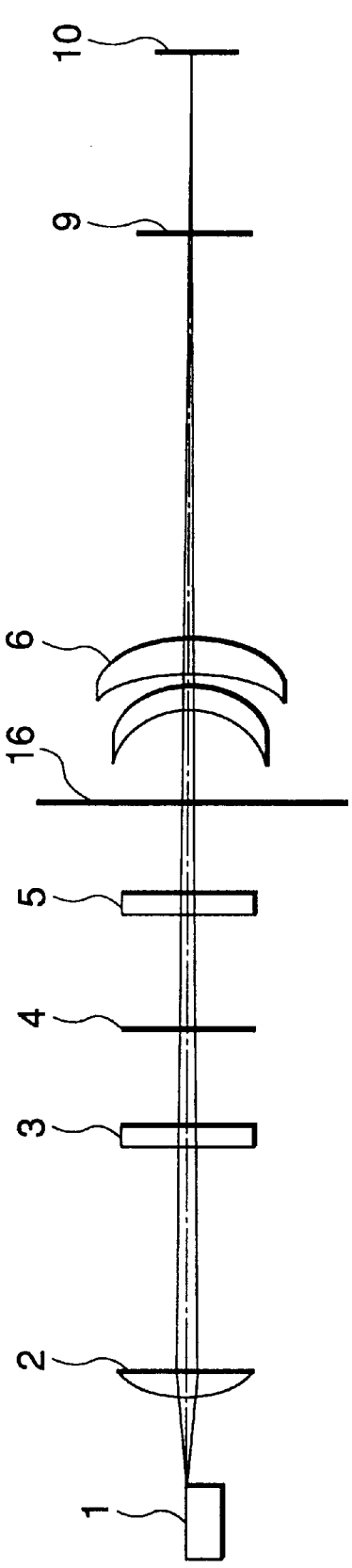

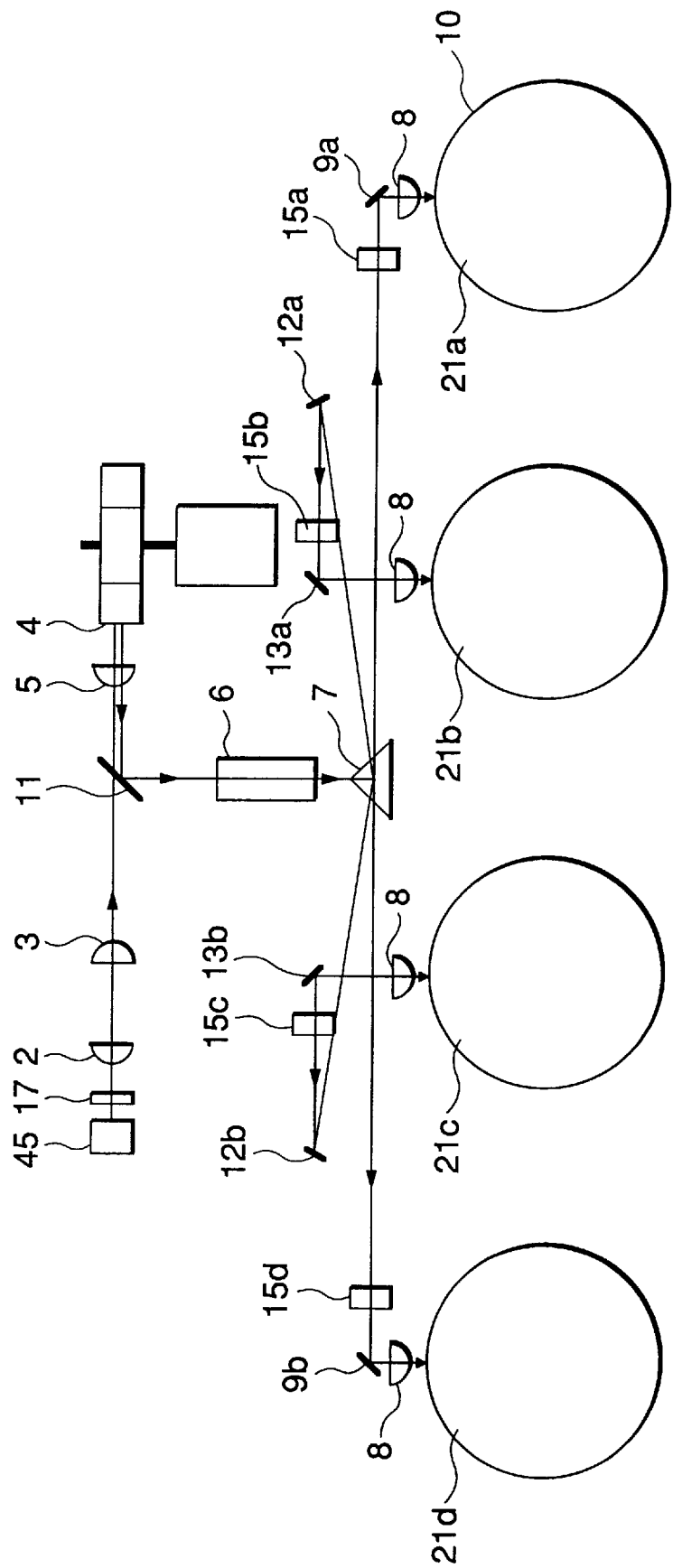

LASER BEAM PRINTER WITH A COMMON SCANNING OPTICAL SYSTEM

This is a division of application Ser. No. 08/222,642, filed Apr. 4, 1994.

BACKGROUND OF THE INVENTION

The present invention relates to a laser beam printer and, more specifically, to a color laser beam printer which can produce printed images of a plurality of colors.

Conventionally, what is called a tandem-type color laser printer is known which is constituted of a plurality of scanning optical systems and a plurality of electrophotographic units as shown in FIG. 22. In FIG. 22, latent images of, for instance, cyan, magenta, yellow and black are written, by scanning optical systems 20a–20d, to photoreceptor drums 21a–21d that have been charged by means of charging devices 26a–26d such as corotrons, respectively. Toner images obtained by developing the latent images by respective developing devices 25a–25d are transferred onto each of sheets 22a–22c that are being transported on a transport belt 23, and then fused by a fusing device 24 to form into a color image. The photoreceptor drums 21a–21d are cleaned by respective cleaners 27a–27d.

A tandem-type color laser printer needs a plurality of scanning optical systems; for instance, the printer of FIG. 22 has the four scanning optical systems. Decreasing the number of scanning optical systems is expected to greatly reduce the cost. In particular, decreasing the number of polygon scanners will reduce not only the cost but also the power consumption.

For the above reason, several attempts have conventionally been made to decrease the number of polygon scanners. For example, Japanese Patent Application Unexamined Publication No. Sho. 58-23074 discloses a technique in which two polygon scanners are provided in a tandem-type color laser beam printer having four photoreceptors, and two photoreceptors are alternately exposed with a laser beam from one polygon scanner by a switching operation of a switching mirror.

However, in this apparatus, the mechanical optical path switching operation of the switching mirror makes the configuration of the apparatus complex, resulting in an increased cost and a difficulty in exposing the photoreceptors with a high positional accuracy. Further, the existence of movable portions makes the apparatus less reliable.

Japanese Patent Application Unexamined Publication No. Hei. 3-42612 discloses a technique in which one polygon scanner is provided in a tandem-type color laser beam printer having four photoreceptors, and four laser beams are input from both sides of the polygon scanner and reflected by different mirror faces to effect simultaneous scans by the four laser beams.

However, this apparatus uses only the single polygon scanner, the optical systems need to be provided independently for the respective laser beams. Therefore, the size of the whole optical system cannot be reduced sufficiently.

SUMMARY OF THE INVENTION

An object of the present invention is to provide a compact, low-cost laser beam printer in which a single scanning optical system is shared with a plurality of beams.

According to the invention, a laser beam printer in which an image is formed on each of a plurality of photoreceptors arranged along a sheet transport path by laser beam exposure, comprises:

a laser array for emitting a plurality of laser beams;

means for deflecting the plurality of laser beams together;

means for separating the deflected laser beams to different directions that are generally along an arrangement direction of the plurality of photoreceptors; and means for directing the separated laser beams to the respective photoreceptors.

According to another aspect of the invention, a laser beam printer comprises:

a laser array for emitting a plurality of laser beams;

means for defecting the plurality of laser beams together;

means for separating the deflected laser beams;

means for directing the separated laser beams to at least one photoreceptor; and an optical system disposed between the laser array and the photoreceptors so that a beam emitting surface of the laser array and the separating means are in an optically conjugate relationship, for converging the laser beams onto the at least one photoreceptor.

According to still another aspect of the invention, a laser beam printer in which an image is formed on each of a plurality of photoreceptors arranged along a sheet transport path by laser beam exposure, comprises:

a laser array for emitting a plurality of laser beams;

means for deflecting the plurality of laser beams together;

means for separating the deflected laser beams; and means disposed in respective optical paths of the separated laser beams, for equalizing lengths of the optical paths from the laser array to the respective photoreceptors.

In the laser beam printer of the invention, the laser beams emitted from the laser array are deflected together. The deflected laser beams are separated to the different directions that are generally along the arrangement direction of the photoreceptors, and then input to the respective photoreceptors. Therefore, most of the scanning optical system can be shared with the plurality of photoreceptors, to reduce the size of the printer.

Since the beam emitting surface of the laser array and the separating means are in an optically conjugate relationship, the plurality of laser beams emitted from the laser array are converged to different, small areas of the separating means, to facilitate the separation of the laser beams.

By virtue of the optical path length equalizing means, the optical path lengths from the laser array to the respective photoreceptors are equalized, to enable the respective photoreceptors to be exposed with correct beam converging states.

BRIEF DESCRIPTION OF THE DRAWINGS

FIGS. 4(a) and 4(b) are development diagrams of a scanning optical system of the first embodiment in planes including the optical axis;

FIGS. 7(a) and 7(b) are development diagrams of a scanning optical system of a laser beam printer according to a modification of the first embodiment in planes including the optical axis;

FIGS. 12(a) and 12(b) are development diagrams of a scanning optical system of the laser beam printer according to the second embodiment in planes including the optical axis;

FIG. 19 schematically shows another configuration of a tandem-type color laser beam printer;

DESCRIPTION OF THE PREFERRED EMBODIMENTS

Figure 1:
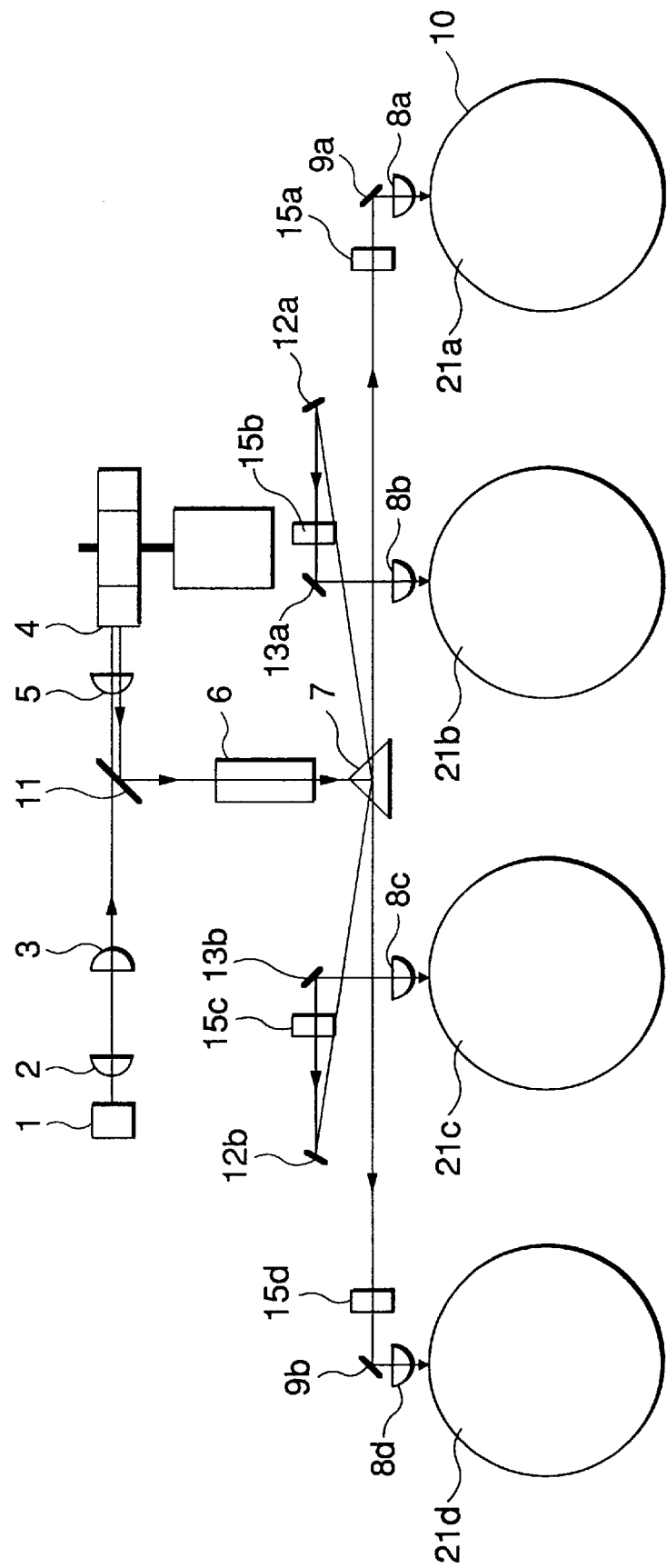
FIG. 1 schematically shows a configuration of a laser beam printer according to a first embodiment of the present invention.

FIG. 1 shows a configuration of a tandem-type laser beam printer according to a first embodiment of the present invention. In FIG. 1, a semiconductor laser array 1 emits four parallel laser beams arranged in a single plane. The four laser beams emitted from the semiconductor array 1 are input to a polygon mirror 4 via a collimator lens 2 and cylindrical lens 3, along a direction that is difference from a direction including a mirror 11. After being reflected by a face of the polygon mirror 4, the four laser beams pass through the cylindrical lens 5, and are then reflected by the mirror 11. After passing through an F-θ lens 6, the four laser beams are separated by a beam separating means 7 so as to take different paths. The separated laser beams pass through distortion correcting means 15a–15d and cylindrical lenses 8a–8d, and scan photoreceptors 21a–21d, respectively. The photoreceptors 21a–21d are arranged along a sheet transport path at equal intervals. Optical path length adjusting means 12a/13a and 12b/13b are provided in the optical paths of the two laser beams for scanning the inside photoreceptors 21b and 21c, respectively, and serve to bend the optical paths of these two laser beams so as to equalize the optical path lengths from the laser array 1 to the respective photoreceptors 21a–21d. The equalization of the optical path lengths enables correct formation of images on the respective photoreceptors 21a–21d. The scanning direction of the polygon mirror 4 is called the main scanning direction and the direction perpendicular thereto, i.e., the moving direction of the photoreceptors 21a–21d is called the auxiliary scanning direction.

Figure 2:
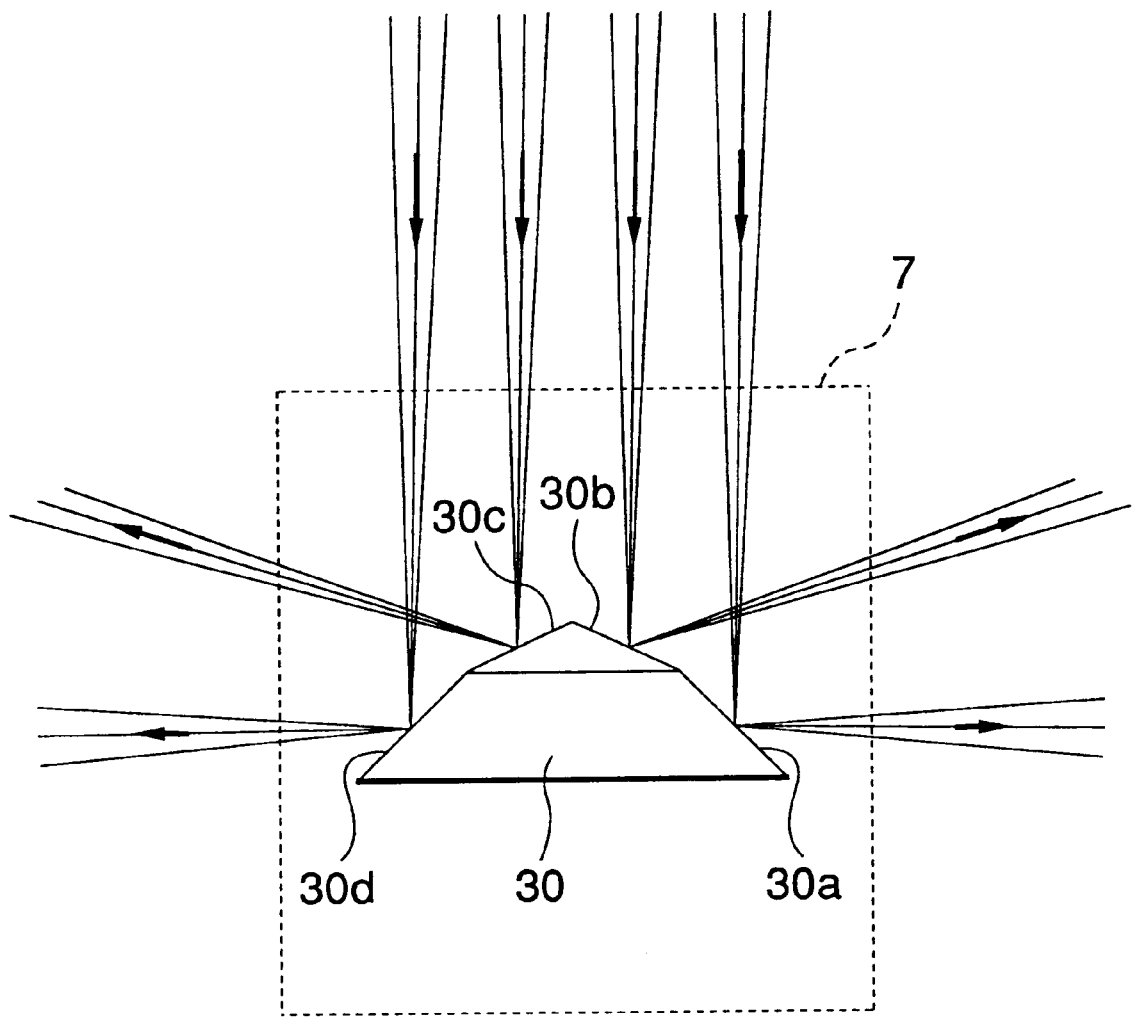
FIG. 2 illustrates how converging beams are separated by a prism type reflector.

For example, as shown in FIG. 2, the beam separating means 7 is a prism type reflector 30, which has four reflecting faces 30a–30d whose angles with respect to the optical axis of the F-θ lens 6 are different from one another. The four parallel laser beams coming from the F-θ lens 6 are reflected by the four reflecting faces 30a–30d to difference directions. In the example of FIG. 2, the angles of the four reflecting faces 30a–30d are so set that the four reflected laser beams are symmetrical with respect to the axis of beam incidence.

Figure 3:
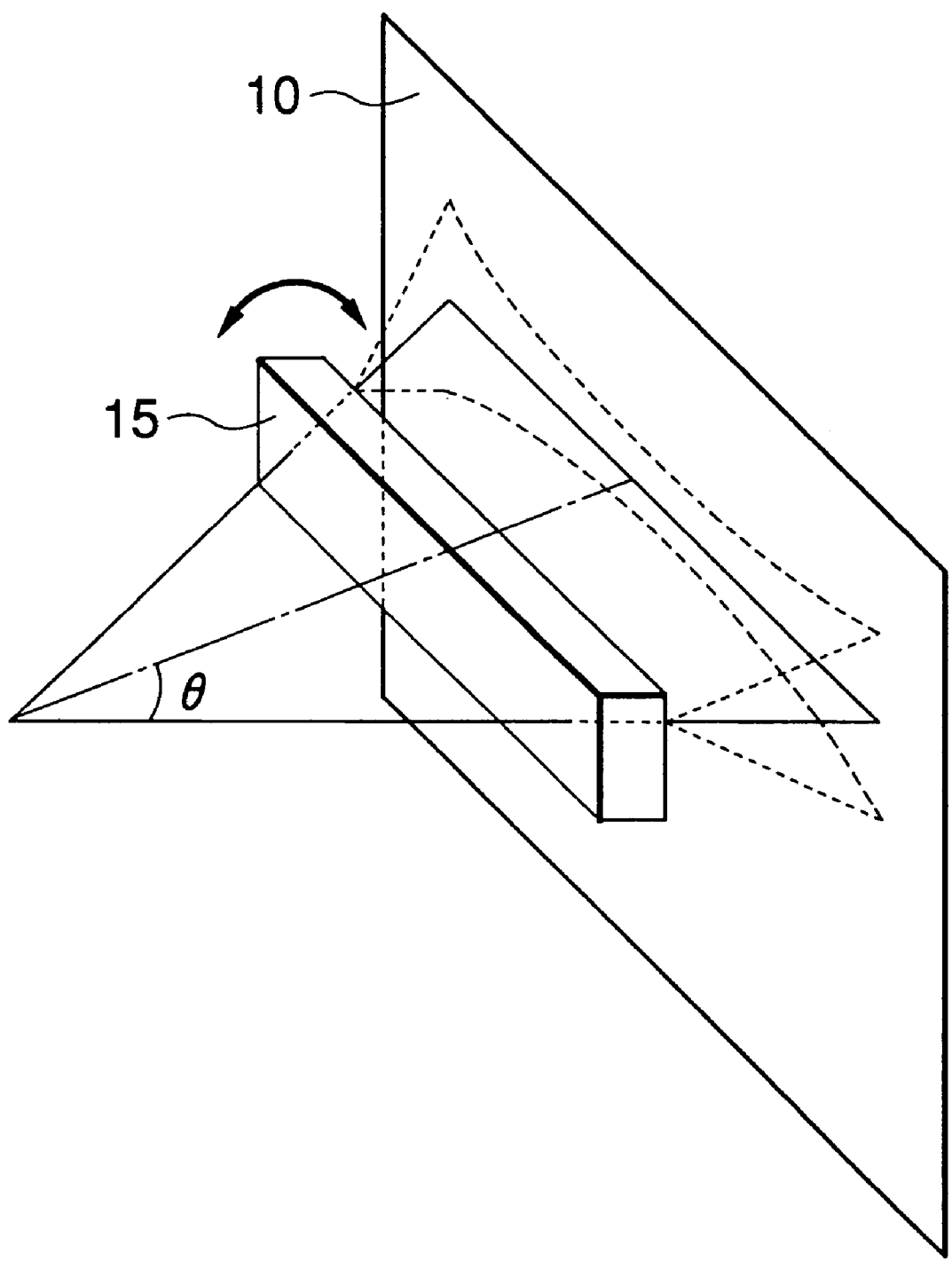
FIG. 3 schematically illustrates how distortion occurs due to a parallel plate.

As schematically shown in FIG. 3, each of the distortion correcting means 15a–15d is a parallel glass plate whose angle with respect to a photoreceptor surface 10 is adjustable. To facilitate understanding, the optical path from the polygon mirror 4 to the photoreceptor surface 10 is expanded in FIG. 3.

FIGS. 4(a) and 4(b) are development diagrams of the scanning optical system of the laser beam printer according to the first embodiment of the invention in planes including the optical axis that are taken along the auxiliary and main scanning directions, respectively. Since the cylindrical lenses 3 and 5 have power only in the auxiliary direction as shown in FIGS. 4(a) and 4(b), each of the four laser beams output from the emitting surface of the semiconductor laser array 1 is converged onto the polygon mirror 4 by the collimator lens 2 and the cylindrical lens 3, and then onto the beam separating means 7 by the cylindrical lens 5 and the F-θ lens 6. That is, in the auxiliary scanning direction, the beam emitting surface of the semiconductor laser array 1 and the polygon mirror 4 are in an optically conjugate relationship. That is, this part is an anamorphic optical system for correcting a face tilt of the polygon mirror 4. The polygon mirror 4 and the beam separating means 7 are also in an optically conjugate relationship. Therefore, as shown in FIG. 2, the laser beams are converged onto the prism type reflector 30 that constitutes the beam separating means 7 so as to form small spots at different positions on the reflector 30. Thus, the four laser beams can easily be separated by the respective reflecting faces 30a–30d of the prism type reflector 30. Further, the beam separating means 7 and the photoreceptor surface 10 are in an optically conjugate relationship.

In the main scanning direction, as shown in FIG. 4(b), the laser beams emitted from the semiconductor laser array 1 are converted to parallel beams by the collimator lens 2, and then converged onto the photoreceptor surfaces 10 by the F-θ lens 6.

It is appropriate that an array interval $r_1$ of the semiconductor laser array 1 be in the range of 100 to 1,000 μm. It is particularly preferable that the array interval $r_1$ be around 500 μm. If it is smaller than 100 μm, it is difficult to separate the beams and to manufacture the semiconductor laser array 1. If it is larger than 1,000 μm, the device size of the semiconductor laser array 1 becomes excessively large, to cause a cost increase. It is desired that the focal length of the F-θ lens 6 be in the range of 200 to 400 mm. If it is smaller than 200 mm, a sufficient scanning width is not obtained. If it is larger than 400 mm, an unduly large diameter of the polygon mirror 4 is required to converge the beams into spots of a desired diameter. The magnification of projection from the beam emitting surface of the semiconductor laser array 1 to the photoreceptor surface 10 is about 10.

Next, image distortion due to slanted incidence of the laser beam onto the F-θ lens 6 with respect to the optical axis will be discussed below.

Figure 5:
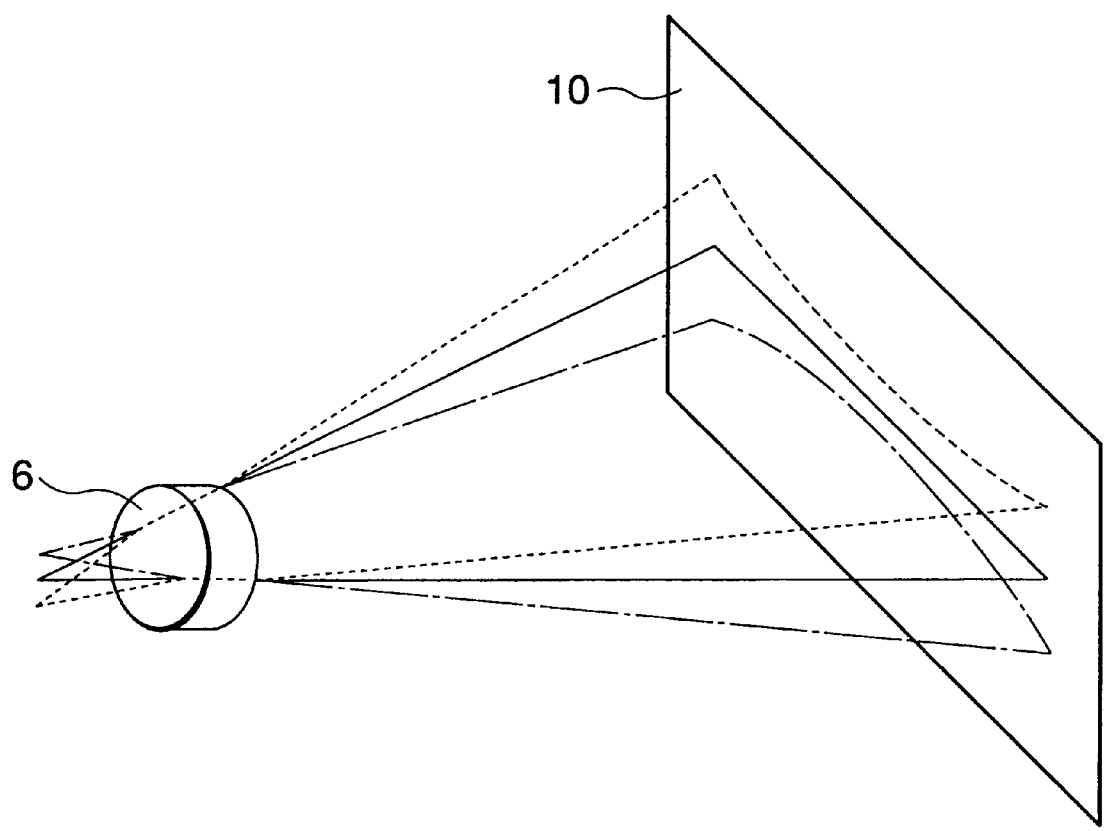
FIG. 5 schematically shows how a scanning line curves due to an F-θ lens.

It is known that a scanning line produced by a laser beam that slantingly (with respect to the optical axis) enters the F-θ lens 6 assumes a bow-shaped curve on the image forming surface, i.e., photoreceptor surface 10 due to the distortion (see FIG. 5). (For example, refer to Japanese Patent Application Examined Publication No. Hei. 2-20986 and K. Minoura, M. Suzuki and S. Miyazawa, SPIE Proc., Vol. 1,079, pp. 462–474 (1989)). This phenomenon of a curved scanning line is a serious problem in the multi-beam laser printer in which the photoreceptor surfaces 10 are simultaneously scanned by a plurality of laser beams. In the first embodiment shown in FIG. 1, although the scanning in each electrophotographic unit is not of multi-beam scanning, the problem of a bow-shaped scanning line still exists because a plurality of laser beams enter the single F-θ lens 6 at different angles.

A means for correcting a curved scanning line will be described below. Referring to FIG. 3, it is known that a scanning line produced by a laser beam that slantingly enters a the parallel glass plate 15 is curved to assume a bow shape due to the distortion. In this case, the sign and amount of the distortion varies depending on the incidence angle of the laser beam (see H. Kubota "Optics" (in Japanese), Iwanami Shoten, Publishers, 1964). Therefore, bow-shaped scanning lines as caused by the F-θ lens 6 can be corrected by disposing, downstream of the beam separating means 7, the distortion correcting means 15a–15d each constituted of an angle-adjustable parallel glass plate. In the first embodiment shown in FIG. 1, bow-shaped scanning lines are corrected based on this principle.

Figure 6:
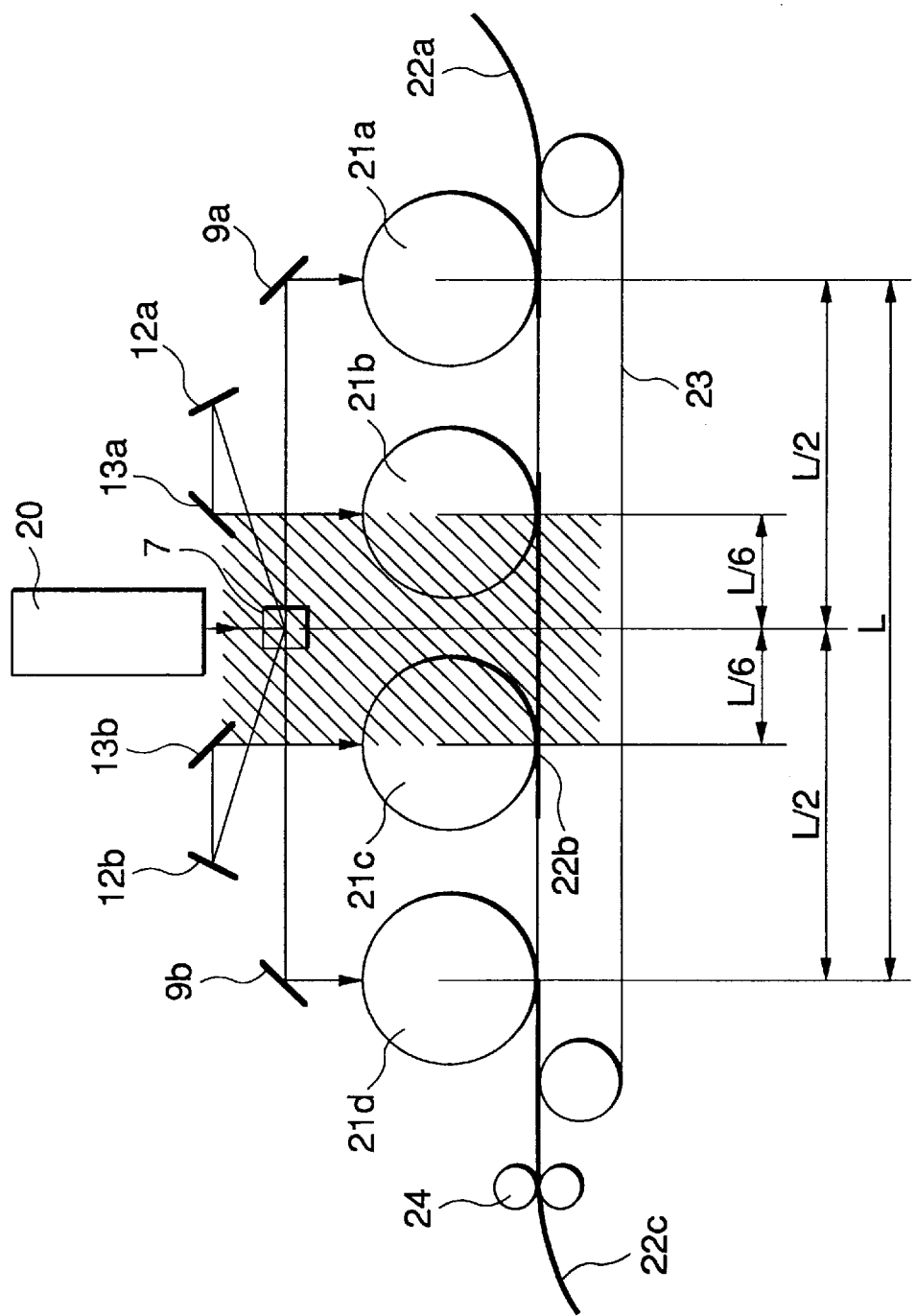
FIG. 6 schematically shows a desirable range where a beam separating means is disposed.

Next, a discussion will be made of the position at which the beam separating means 7 is disposed. FIG. 6 illustrates a positional relationship between the beam separating means 7 and the photoreceptor drums 21a–21d. The optics from the semiconductor laser array 1 to the F-θ lens 6 that serves as a scanning optical system is represented by a single block 20.

It is desired that the beam separating means 7 be located in a range (hatched in FIG. 6) bounded by positions that are distant by L/6 from the center line of the outside photoreceptor drums 21a and 21d (L: an interval between exposing points of these photoreceptor drums), i.e., in a range between the axes of the inside photoreceptor drums 21b and 21c. It is particularly preferable that the beam separating means be located on the above center line, to minimize differences between optical path lengths of the laser beams as separated by the beam separating means 7. For this reason, the beam separating means 7 is located on the above center line in the first embodiment shown in FIG. 1. Although FIG. 6 shows the case of four photoreceptor drums, it is apparent that the number of photoreceptor drums may be any number not less than 2.

Figure 8:
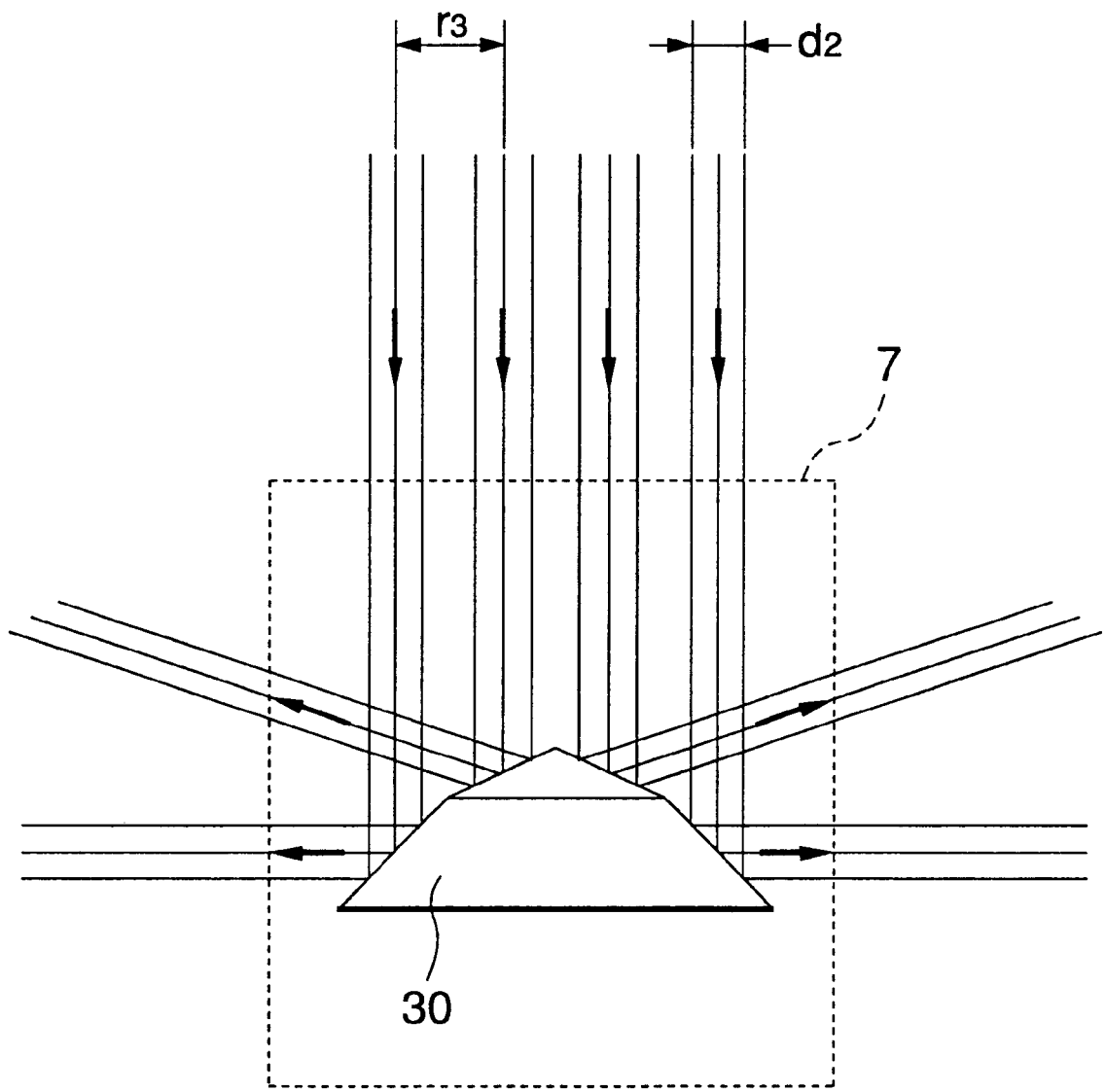
FIG. 8 illustrates how parallel beams are separated by the prism type reflector.

In the first embodiment shown in FIG. 1, each laser beam is converged onto the beam separating means 7 in the auxiliary scanning direction (see FIG. 4(a)). Alternatively, as in a modification shown in FIGS. 7(a) and 7(b), the optical system may be constituted so that a parallel beam is input to the beam separating means 7. FIGS. 7(a) and 7(b) are development diagrams in planes including the optical axis. In this case, as shown in FIG. 8, upon incidence onto the corresponding reflecting face of the prism type reflector 30, each parallel beam changes its path while maintaining its parallelism. The laser beams are separated in this manner.

Figure 9:
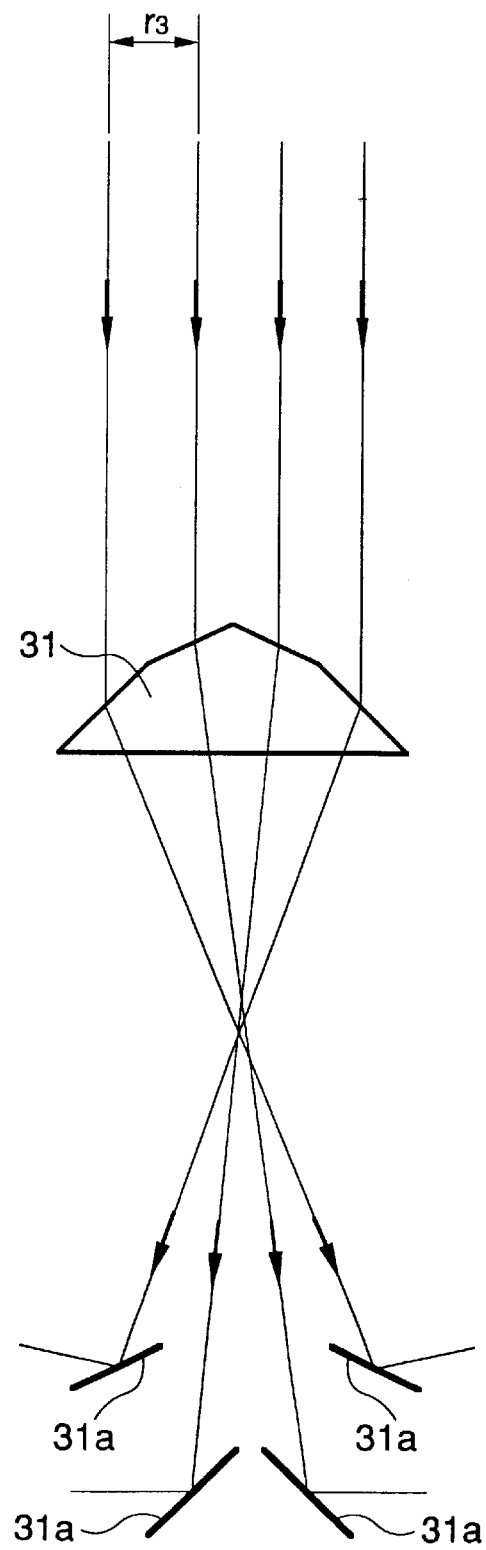
FIG. 9 illustrates how beams are separated by another type of beam separating means.
Figure 10A:
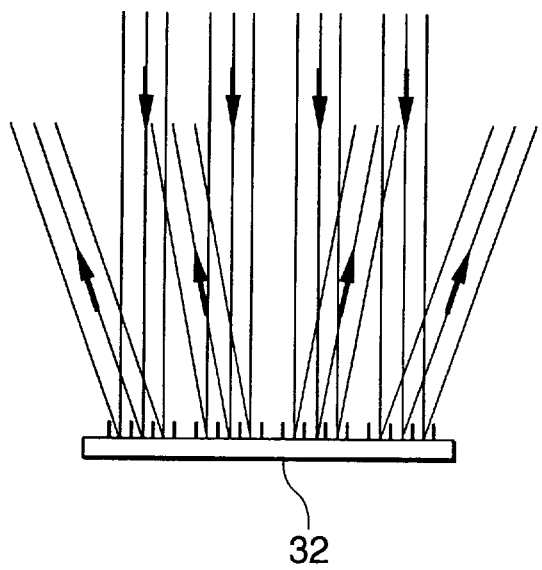
FIGS. 10(a)–10(c) illustrate how beams are separated by arrayed optical means.
Figure 10B:
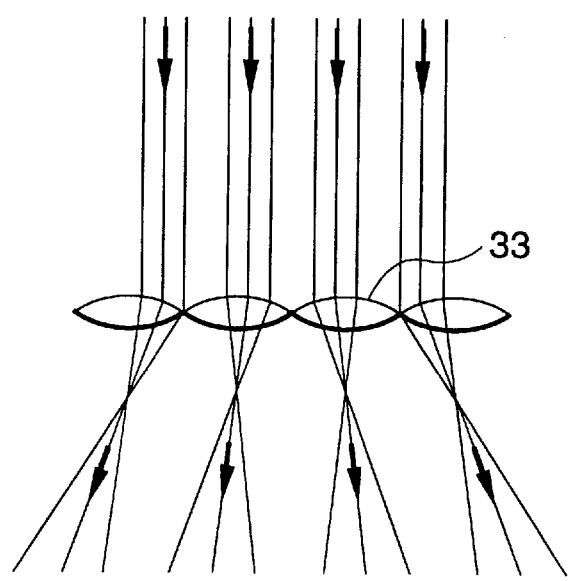
Figure 10C:
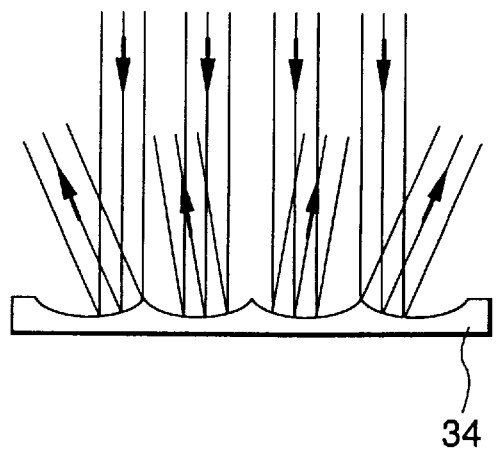

The structure of the beam separating means 7 is not limited to the above one, but various optical means may be used as the beam separating means 7. For example, as shown in FIG. 9, the beam separating means 7 may consists of a prim 31 having differently angled light incident faces of a number corresponding to the number (in this case, four) of laser beams, and four mirrors 31a. Further, a diffraction grating array 32 (FIG. 10(a)), a lens array 33 (FIG. 10(b)), a concave mirror array 34 (FIG. 10(c)), etc. may also be used as the beam separating means 7. Although the examples of FIGS. 10(a)–10(c) are directed to the case of a parallel beam, they can also be used for a converging beam.

A designing method of the optical system will be described below.

Design parameters used in designing the optical system that employs the cylindrical F-θ lens 6 are shown in FIG. 7(a). Specifically, $r_1$ denotes a laser element interval of the semiconductor laser array 1; $f_1$, a focal length of the collimator lens 2; $\theta_1$, a diverging angle of a laser beam emitted from each laser element; $d_1$, a beam diameter on the collimator lens 2; $f_2$, a focal length of the cylindrical lens 3; $f_3$, a focal length of the cylindrical lens 5; $l_1$, a distance between the cylindrical lens 5 and the beam separating means 7; $l_2$, a distance between the optically symmetrical axis of the F-θ lens 6 and the beam separating means 7; $r_2$, an interval between the optical axes of the adjacent laser beams as reflected by the polygon mirror 4; $\theta_2$, a diverging angle of each laser beam as reflected by the polygon mirror 4; $d_2$, a diameter in the auxiliary scanning direction of a laser beam on each reflecting face of the beam separating means 7; and $r_3$, an interval between the optical axes of the adjacent laser beams on the beam separating means 7. With the above definitions, the following relationships hold:

$$d_1 = f_1 \cdot \theta_1$$

$$m_1 = f_2/f_1$$

($m_1$: magnification of the collimator lens 2 and cylindrical lenses 3)

$$\theta_1 = m_1 \cdot \theta_2$$

$$r_2 = m_1 \cdot r_1$$

$$d_2 = f_3 \cdot \theta_2$$

$$r_3/r_2 = (l_2 - f_3)/f_3$$

Since, as shown in FIG. 8, the interval between the optical axes of the adjacent laser beams on the reflecting faces of the prism type reflector 30 is $r_3$ and the beam diameter in the auxiliary scanning direction on each reflecting face is $d_2$, it is preferred that the length of the reflecting face in the direction corresponding to the auxiliary scanning direction be not less than $d_2$ and that $r_3$ be larger than $d_2$. Therefore, $d_2/r_3$ should be as small as possible.

The ratio $d_2/r_3$ can be reduced by increasing $r_3$ or decreasing $d_2$. To sufficiently increase $r_3$, the beam separating means 7 necessarily becomes large. Therefore, it would be an appropriate course to decrease $d_2$. The configuration shown in FIGS. 2, 4(a) and 4(b), in which each laser beam is converged onto the prism type reflector 30, is an implementation of such an design concept. This configuration can be realized by making the cylindrical lens 5 an image forming lens having a proper image forming magnification.

Figure 11:
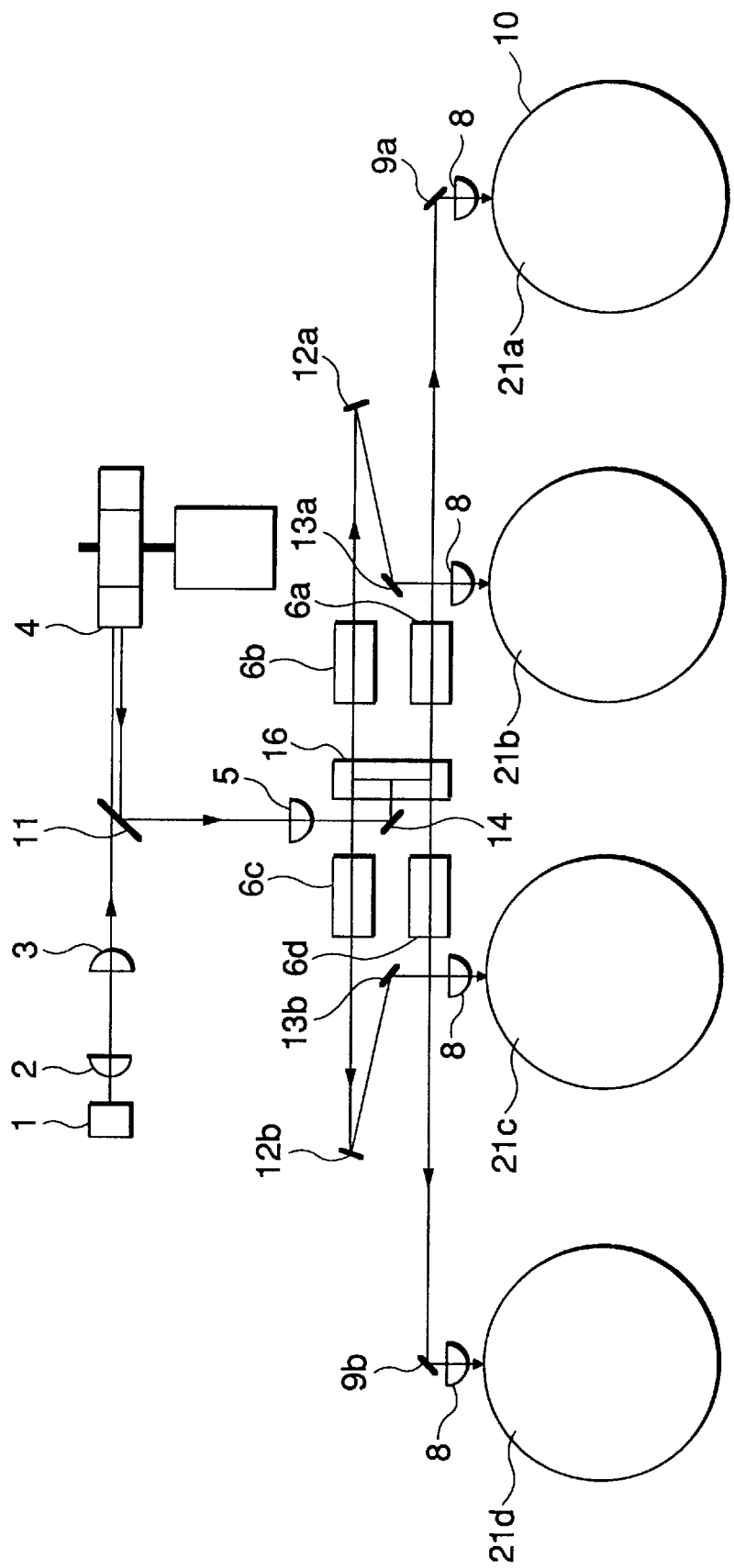
FIG. 11 schematically shows a configuration of a laser beam printer according to a second embodiment of the invention.

FIG. 11 shows a configuration of a laser beam printer according to a second embodiment of the invention. FIGS. 12(a) and 12(b) are development diagrams of an optical system of the second embodiment in planes including the optical axis that are taken along the auxiliary and main scanning directions, respectively. The parts in the second embodiment corresponding to those of the first embodiment are given the same reference symbols. In this embodiment, F-θ lenses 6a–6d are provided for respective electrophotographic units, i.e., photoreceptors. With this configuration, since the laser beams can be input to the respective F-θ lenses 6a–6d perpendicularly, no bow-shaped scanning lines occur unlike the case of the first embodiment. Therefore, the distortion correcting means 15a–15d used in the first embodiment are not necessary in the second embodiment.

Figure 13:
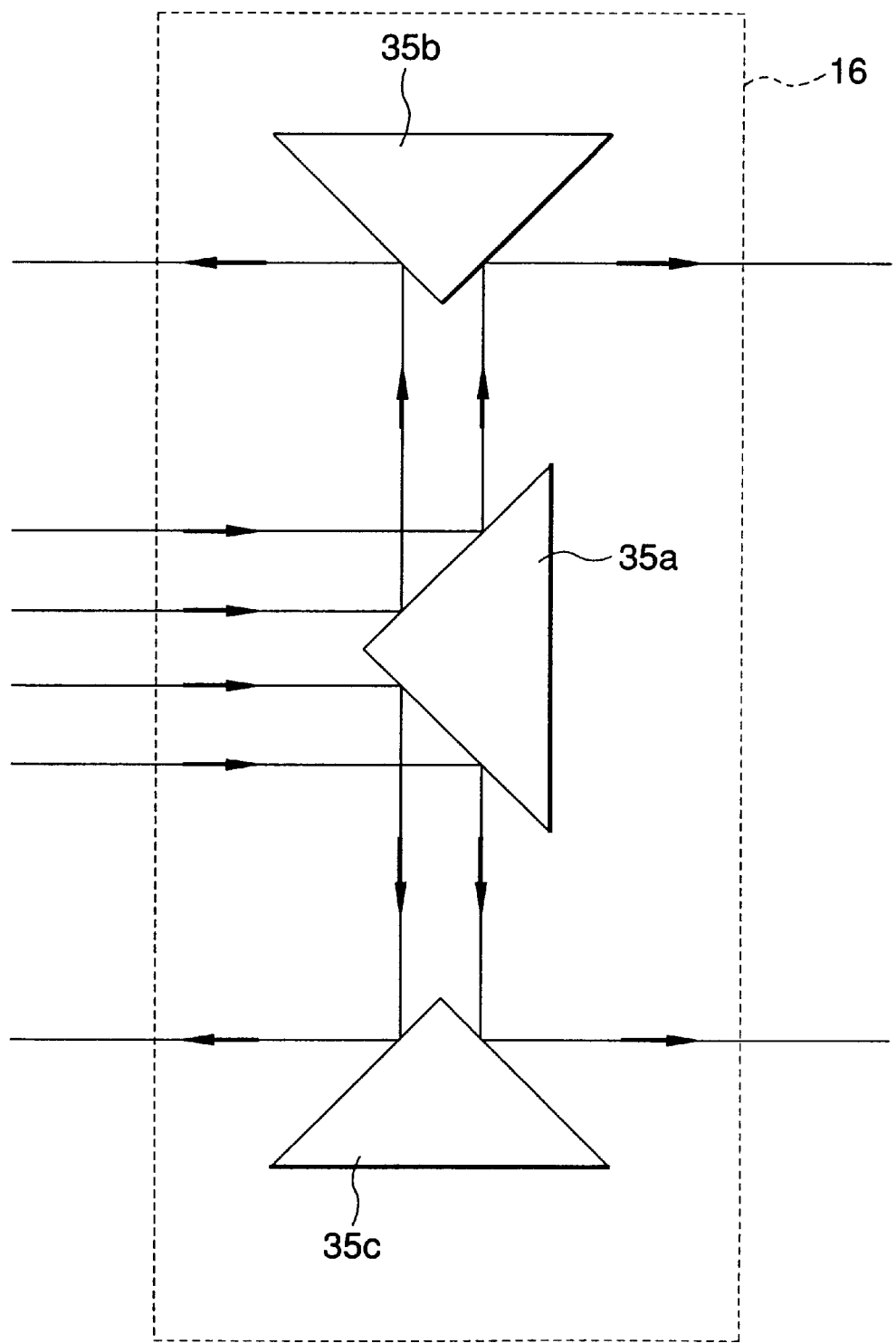
FIG. 13 shows a beam separating means consisting of a plurality of prism type reflectors.

As shown in FIG. 13, a beam separating means 16 consists of three prism type reflectors 35a–35c. However, the invention is not limited to this configuration, but various optical means, for instance, those shown in FIGS. 9 and 10(a)–10(c) may be properly combined to form the beam separating means 16.

The scanning optical systems of the invention can also be applied to what is called a one-path, multi-color laser beam printer in which a plurality of scanning operations are performed on a single photoreceptor drum. (For example, refer to K. Kataoka et al., "Application of a Semiconductor Laser Array to Fast and Multi-color Laser Printers" (in Japanese), The 1982 General National Conference of the Institute of Electronics and Communication Engineers (Spring), 1,100 (1982), Japanese Patent Application Unexamined Publication Nos. Sho. 56-161566 and Hei. 4-114120.)

Figure 14:
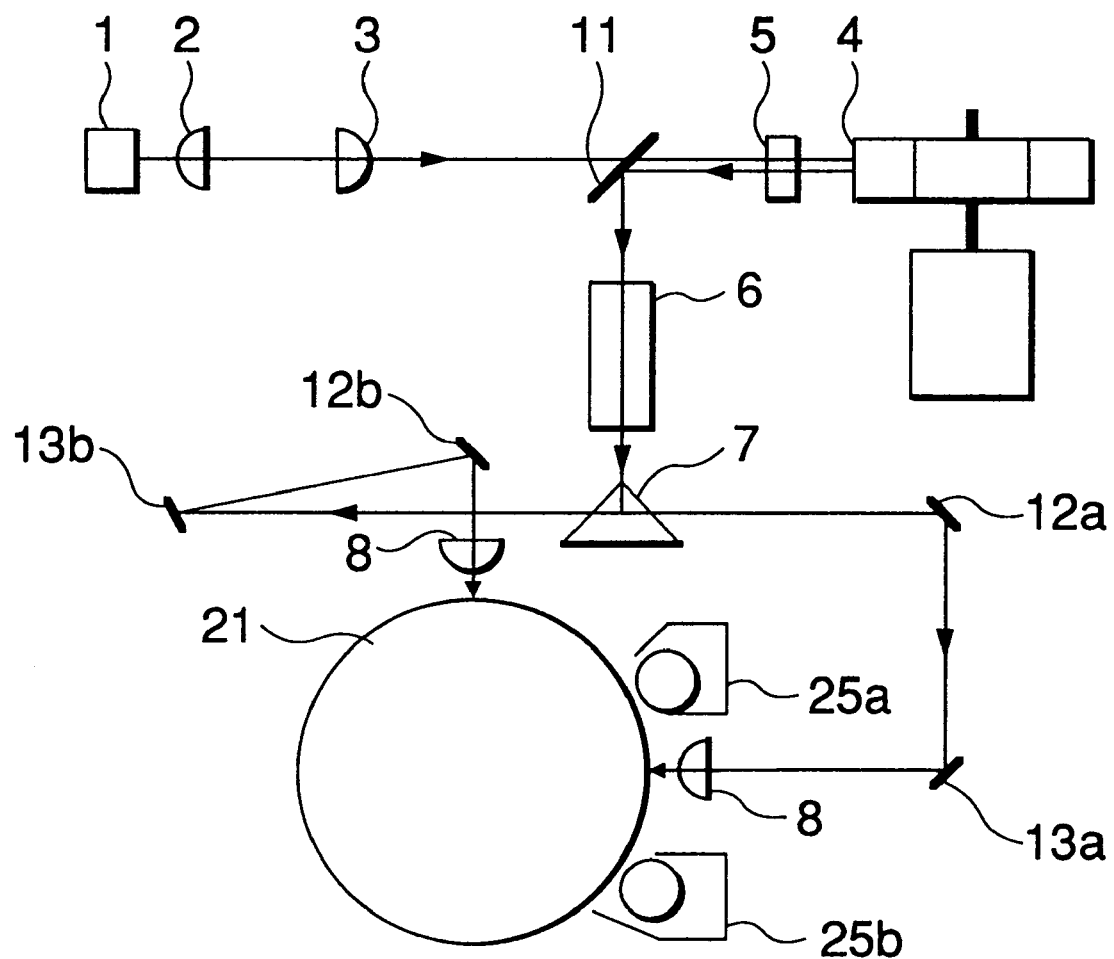
FIG. 14 schematically shows a configuration of a laser beam printer according to a third embodiment of the invention.

FIG. 14 shows an example of a configuration of a one-path, multi-color laser beam printer.

In FIG. 14, two laser beams emitted from a semiconductor laser array 1 are input to a polygon scanner 4 through a collimator lens 2, cylindrical lens 3, mirror 11 and cylindrical lens 5. After being reflected by the polygon mirror 4, the two laser beams are input to a beam separating means having a constitution as shown in FIG. 2 or 11 through the cylindrical lens 5, the mirror 11 and an F-θ lens 6. The optical path of the laser beams is split by the beam separating means 7, so that the laser beams irradiate different portions of a photoreceptor drum 21 to effect exposure. The two laser beams emitted from the semiconductor laser array 1 serve to form latent images for black and red, respectively, and the black and red latent images are developed by respective developing devices 25a and 25b. In this one-path, multi-color laser beam printer, contamination between the two colors is prevented, for instance, by using a reverse development in the developing device 25a and a normal development in the developing device 25b and employing different developing bias voltages therefor.

In the example shown in FIG. 14, the beam separating means 7 such as the prism type reflector is employed in place of individual mirrors that are conventionally used. As a result, there is no need of adjusting the individual mirrors, which means provision of a beam separating means that can be handled easily.

While in the tandem-type color laser beam printers shown in FIGS. 1 and 11 each photoreceptor surface is exposed with a single laser beam, each photoreceptor surface may be exposed with two laser beams.

A description will be made of an example of a configuration of a multi-beam semiconductor laser array used in such a tandem-type color laser beam printer using multiple beams.

Figure 15:
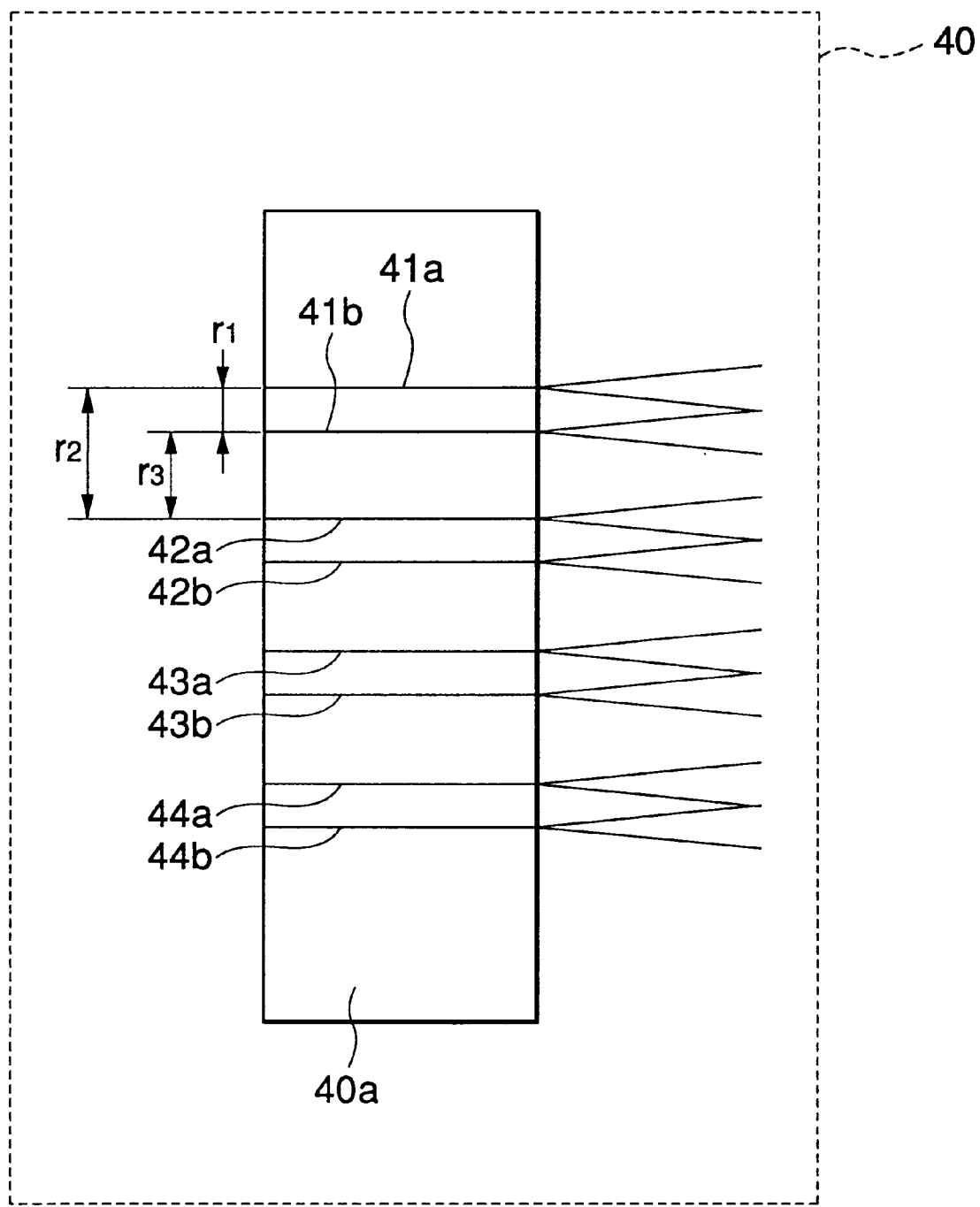
FIG. 15 is a plan view showing an example of a structure of a multi-beam semiconductor laser array.

FIG. 15 is a plan view of a multi-beam semiconductor laser array 40. Semiconductor laser elements 41a–44a and 41b–44b formed on a substrate 40a to constitute the multi-beam semiconductor laser array 40 are arranged into four groups each including two laser elements. For example, the semiconductor laser elements 41a and 41b constitute one group. The semiconductor laser elements in each group are spaced by $r_1$, and the groups are arranged at an interval (period) $r_2$. Therefore, there are two kinds of intervals between the adjacent semiconductor laser elements, $r_1$ and $r_3$, where $r_3 > r_1$.

Figure 16:
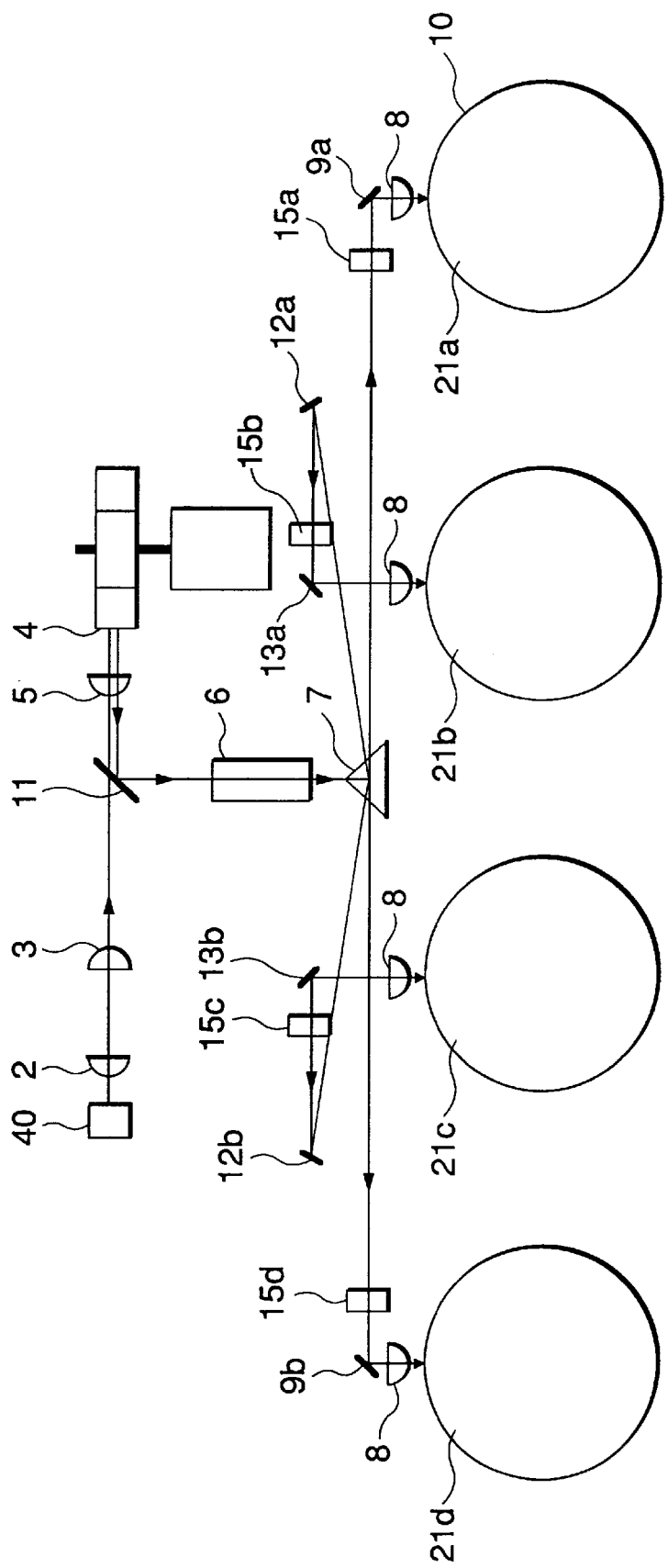
FIG. 16 schematically shows a configuration of a tandem-type color laser beam printer using the multi-beam semiconductor laser array of FIG. 15.
Figure 17:
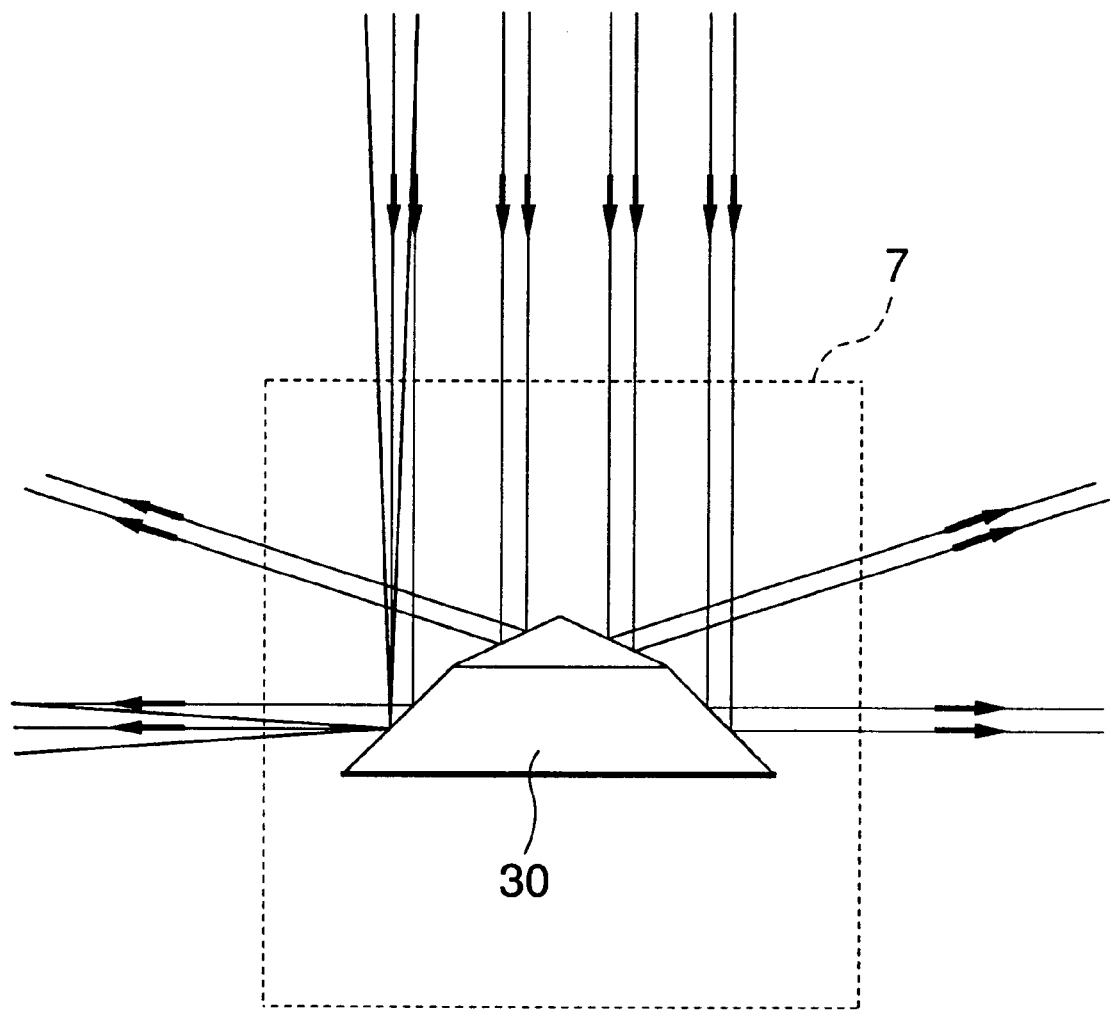
FIG. 17 illustrates how beams are separated by a prism type reflector in the tandem-type color laser beam printer of FIG. 16.

FIG. 16 schematically shows a configuration of a tandem-type color laser beam printer to which the multi-beam semiconductor laser array 40 of FIG. 15 is applied. In the color laser beam printer shown in FIG. 16, eight laser beams travel in the form of a bundle, and separated in the same manner as in the embodiment of FIG. 1 except that the path splitting is effected for every group of two laser beams.

In the multi-beam semiconductor laser array 40 shown in FIG. 15, the interval $r_1$ between the semiconductor laser elements in each group is 14 μm, and the interval (period) $r_2$ between the adjacent groups is 500 μm.

Figure 18A:
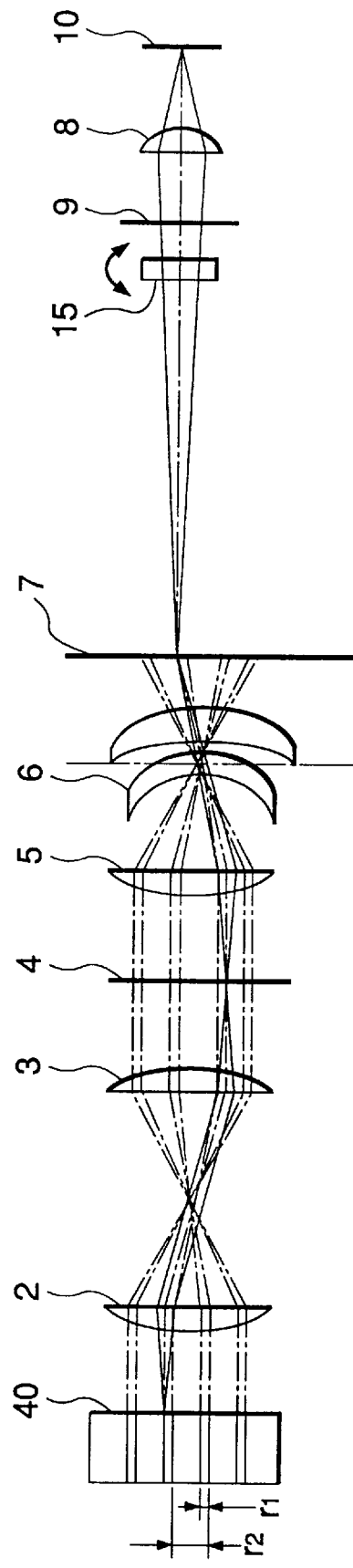
FIGS. 18(a) and 18(b) are development diagrams of a scanning optical system of the tandem-type color laser beam printer of FIG. 16 in planes including the optical axis.
Figure 18B:
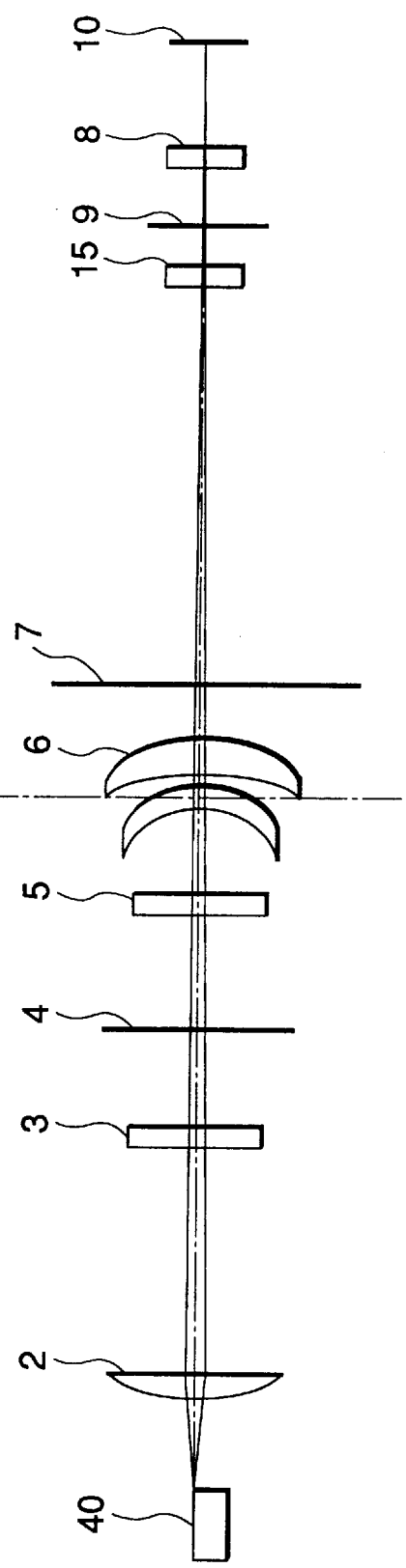

FIGS. 18(a) and 18(b) are development diagrams of an optical system of the tandem-type color laser beam printer of FIG. 16 in planes including the optical axis that are taken along the auxiliary and main scanning directions, respectively. The optical system of FIGS. 18(a) and 18(b) are different from that of FIGS. 4(a) and 4(b) only in that the number of laser beams incident on each of photoreceptors 21a–21d is two rather than one, and that each photoreceptor surface 10 is scanned with two laser beams according to an interlaced scanning scheme, which is well known in the art. Therefore, a detailed description of the laser beam printer of FIG. 16 is omitted.

The tandem-type color laser beam printer of FIG. 16 can produce images at high speed or high resolution, since each of the photoreceptors 21a–21d is scanned with two laser beams (multi-beam scanning). In addition, the scanning exposure can be effected at four places by use of the paired polygon mirror 4 and the F-θ lens 6.

FIG. 19 schematically shows a configuration of a tandem-type color laser beam printer which uses a multi-beam semiconductor laser array 45 (see FIG. 20) whose structure is different than the multi-beam semiconductor laser array 40 of FIG. 15. The color laser printer of FIG. 19 is different from that of FIG. 16 in that the multi-beam semiconductor laser array 45 whose element interval is different than the multi-beam semiconductor laser array 40, that a microlens array 17 is disposed between the multi-beam semiconductor array 45 and a collimator lens 2, and that interlaced scanning is not employed on each photoreceptor surface 10.

Figure 20:
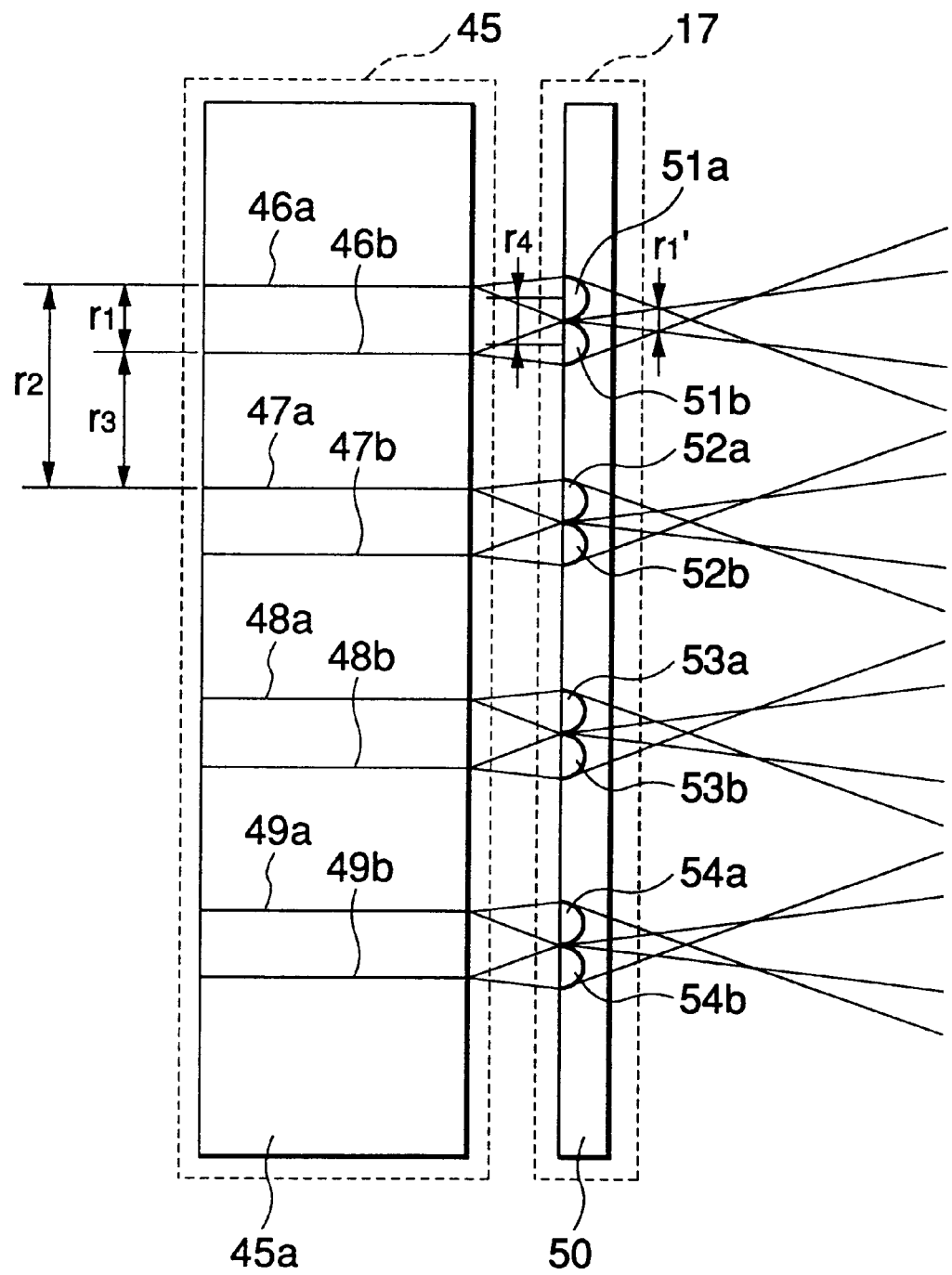
FIG. 20 is an enlarged view showing optics including a semiconductor laser array and a microlens array used in the color laser beam printer of FIG. 19.

The optics including the multi-beam semiconductor laser array 45 and the microlens array 17 is shown in FIG. 20 in an enlarged manner. Semiconductor laser elements 46a–49a and 46b–49b formed on a substrate 45a to constitute the multi-beam semiconductor laser array 45 are arranged into four groups each including two laser elements. For example, the semiconductor laser elements 46a and 46b constitute one group. The semiconductor laser elements in each group are spaced by $r_1$, and the groups are arranged at an interval (period) $r_2$. Therefore, there are two kinds of intervals between the adjacent semiconductor laser elements, $r_1$ and $r_3$, where $r_3 > r_1$.

As illustrated in FIG. 20, real images of laser beam emitting points of the multi-beam semiconductor laser array 45 are formed on the right side of the microlens array 17. Since the interval $r_1$ between the adjacent semiconductor laser elements and an interval $r_4$ between the adjacent microlenses has a relationship $r_1 > r_4$, an interval $r_1'$ between the adjacent real images of the laser beam emitting points is smaller than the element interval $r_1$. Therefore, the interval between image spots on the photoreceptor can be made closer to enable non-interlaced multi-beam scanning.

With the above constitution, the interval between virtual emitting points of the beams of each group for scanning the same photoreceptor can be made closer while the group interval is kept the same. Therefore, the laser beam groups can be separated more easily.

In the structure shown in FIG. 20, a relay lens or lenses may be disposed between the multi-beam semiconductor laser array 45 and the microlens array 17. To implement the structure of FIG. 20, the multi-beam semiconductor laser array 45 and the microlens array 18 need to be united, because the microlenses of the microlens array 17 have a short focal length. In contrast, by employing the relay lens or lenses, the interval between the multi-beam semiconductor laser array 45 and the microlens array 17 can be increased, to facilitate a mounting operation.

Figure 21:
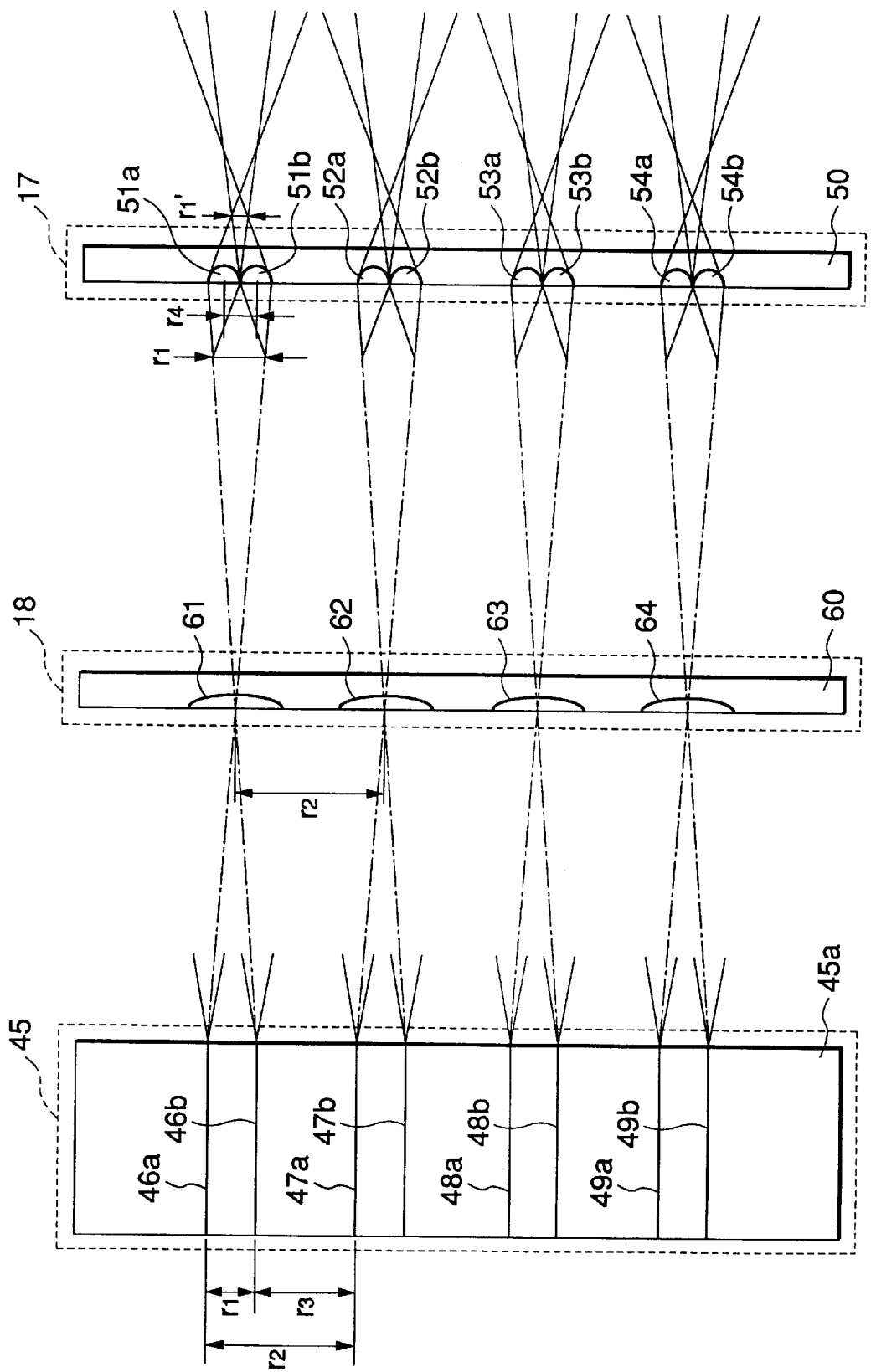
FIG. 21 shows a modified optics in which a relay microlens array is interposed between the multi-beam semiconductor laser array and the microlens array.
Figure 22:
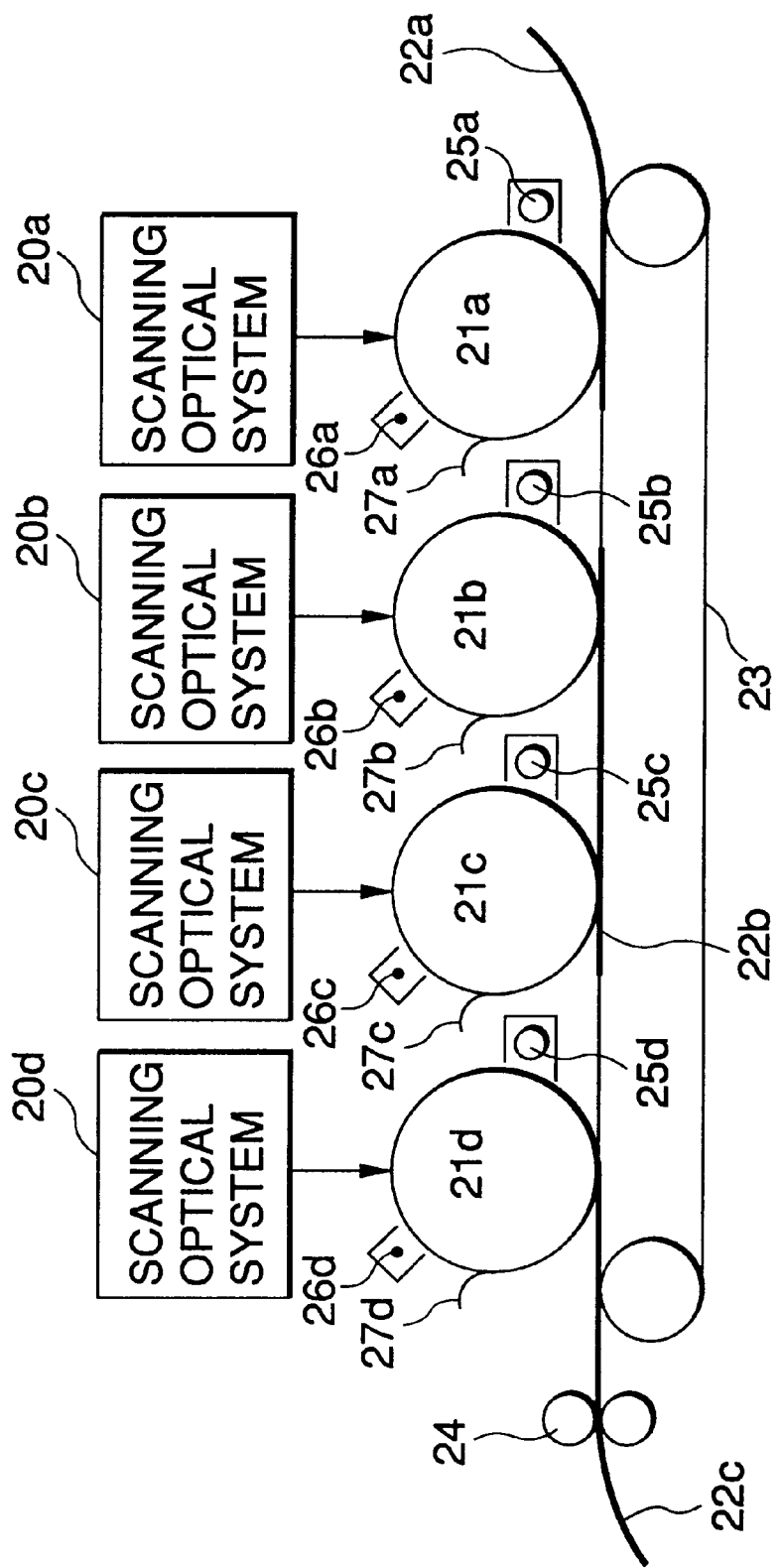
FIG. 22 schematically shows a configuration of a conventional tandem-type color laser beam printer.

It is desirable that relay lenses be provided for the respective groups of semiconductor laser elements. This is so because if only one relay lens is provided to project all the laser beam emitting points of the multi-beam semiconductor laser array 45, the relay lens is required to have a large field angle, resulting in large aberrations for off-axis beams. FIG. 21 shows a preferred, specific configuration in which a relay microlens array 18 is disposed between the multi-beam semiconductor laser array 45 and the microlens array 17. The lens interval of the relay microlens array 18 is identical to the group interval $r_2$ of the multi-beam semiconductor laser array 45.

The above-described multi-beam semiconductor laser arrays 40 and 45 can realize the beam separation and the multi-beam scanning for each color at the same time, because the intervals of the semiconductor laser elements are not uniform. More specifically, while the multi-beam scanning is facilitated by narrowing the interval $r_1$ between the semiconductor laser elements in the same group, the separation of the laser beam groups for the respective colors by widening the interval $r_2$ between the adjacent groups. In particular, the multi-beam scanning and the separation of the laser beam groups can be attained at the same time by setting the intervals $r_1$ and $r_2$ so as to satisfy a relationship $r_2/r_1 > 5$.

By applying the above-described multi-beam semiconductor laser arrays to the tandem-type laser beam printer or one-path, multi-color laser beam printer, laser beam printers can be realized which not only has a high printing speed and a high resolution but also is compact and low in cost and in power consumption. Further, by arranging the multi-beam semiconductor laser array and the microlens array so that they correspond to each other properly, the separation of the laser beam groups can further be facilitated.

As described above, according to the invention, the scanning optical system of the tandem-type color laser beam printer can be shared with a plurality of laser beams, to enable reduction of the size and cost of the printer. Since the polygon mirror can be shared with a plurality of laser beams, power consumption can also be reduced.

What is claimed is:

1. An image forming apparatus comprising:

a semiconductor laser array having a plurality of laser elements for emitting respective laser beams;

a single scanning means for deflecting the laser beams to effect scanning;

a first optical system disposed between the semiconductor laser array and the deflecting means, and having a predetermined image forming magnification;

a second optical system disposed between the semiconductor laser array and the deflecting means, for converging each of the laser beams onto the deflecting means;

means having a plurality of reflecting faces of a number corresponding to the number of the laser beams, for separating the deflected laser beams to respective predetermined directions;

a third optical system disposed between the deflecting means and the separating means;

an F-θ lens disposed between the third optical system and the separating means;

a plurality of photoreceptors arranged so as to optically face the respective reflecting faces, wherein each of the photoreceptors is irradiated by a plurality of directed, separated laser beams; and a transfer medium transport path disposed so as to face each of the plurality of photoreceptors;

wherein a length, in a first direction perpendicular to a scanning direction, of each of the reflecting faces is set larger than or equal to a diameter, in the first direction, of a corresponding one of the laser beams on the reflecting face.

2. An image forming apparatus comprising:

a semiconductor laser array having a plurality of laser elements for emitting respective laser beams;

a single scanning means for deflecting the laser beams to effect scanning;

a first optical system disposed between the semiconductor laser array and the deflecting means, and having a predetermined image forming magnification;

means having a plurality of reflecting faces of a number corresponding to the number of the laser beams, for separating the deflected laser beams to respective predetermined directions;

a second optical system disposed between the deflecting means and the separating means;

an F-θ lens disposed between the third optical system and the separating means;

a plurality of photoreceptors arranged so as to optically face the respective reflecting faces; and a transfer medium transport path disposed so as to face each of the plurality of photoreceptors;

wherein a length, in a first direction perpendicular to a scanning direction, of each of the reflecting faces is set larger than or equal to a diameter, in the first direction, of a corresponding one of the laser beams on the reflecting face.

3. An image forming apparatus comprising:

a semiconductor laser array having a plurality of laser elements for emitting respective laser beams;

a single scanning means for deflecting the laser beams to effect scanning;

a first optical system disposed between the semiconductor laser array and the deflecting means, and having a predetermined image forming magnification;

means having a plurality of reflecting faces of a number corresponding to the number of the laser beams, for separating the deflecting laser beams to respective predetermined directions;

a second optical system disposed between the deflecting means and the separating means;

an F-θ lens disposed between the third optical system and the separating means;

a plurality of photoreceptors arranged so as to optically face the respective reflecting faces, wherein each of the photoreceptors is irradiated by a plurality of directed, separated laser beams; and a transfer medium transport path disposed so as to face each of the plurality of photoreceptors;

wherein a length, in a first direction perpendicular to a scanning direction, of each of the reflecting faces is set larger than or equal to a diameter, in the first direction, of a corresponding one of the laser beams on the reflecting face.

* * * * *